United States Patent
Johnson (10) Patent No.: US 6,633,980 B1
(45) Date of Patent: Oct. 14, 2003

(54) COMPUTING DEVICE COMMUNICATION WITH REPLAY PROTECTION

(75) Inventor: Thomas V. Johnson, Burlington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/333,120

(22) Filed: Jun. 14, 1999

(51) Int. Cl.[7] .................................................. H04L 9/16
(52) U.S. Cl. ...................................... 713/168; 713/171
(58) Field of Search ................................. 713/168, 182, 713/200, 181, 180, 171; 380/277, 278, 284, 281

(56) References Cited

U.S. PATENT DOCUMENTS 5,606,609 A * 2/1997 Houser et al. .............. 713/179
5,889,861 A * 3/1999 Ohashi et al. .............. 380/247
6,105,133 A * 8/2000 Fielder et al. .............. 713/169

* cited by examiner

Primary Examiner—Matthew Smithers
(74) Attorney, Agent, or Firm—Beyer Weaver & Thomas, LLP (57) ABSTRACT

A replay attack prevention technique uses a secret algorithm exchanged between client and servers computers. The algorithm is used to periodically alter a special replay key. The replay key may then be used to alter the message sent or alter the digest appended to the message such that the message and or its digest varies as time progresses. An unscrupulous third party who replays a stolen operation message would be unaware of the replay key and its variation. Any stolen message that is replayed by the third party would not include the time varying aspect as expected by the server computer. The server computer would thus be able to detect the attempted fraud. The secret replay key may be exchanged during the communication session in an encrypted form, or may be exchanged earlier.

21 Claims, 5 Drawing Sheets

COMPUTING DEVICE COMMUNICATION WITH REPLAY PROTECTION

FIELD OF THE INVENTION

The present invention relates generally to communication between two computing devices. More specifically, the present invention relates to a cryptographic technique for preventing a replay attack during such communication.

BACKGROUND OF THE INVENTION

During communication between two computing devices, it is always possible that an unscrupulous third party that is unauthorized may listen to the communication, may tamper with the communication, or may attempt to send spurious communications of its own. One particular attempt at fraud in the communications field is known as a "replay attack."

Figure 1:
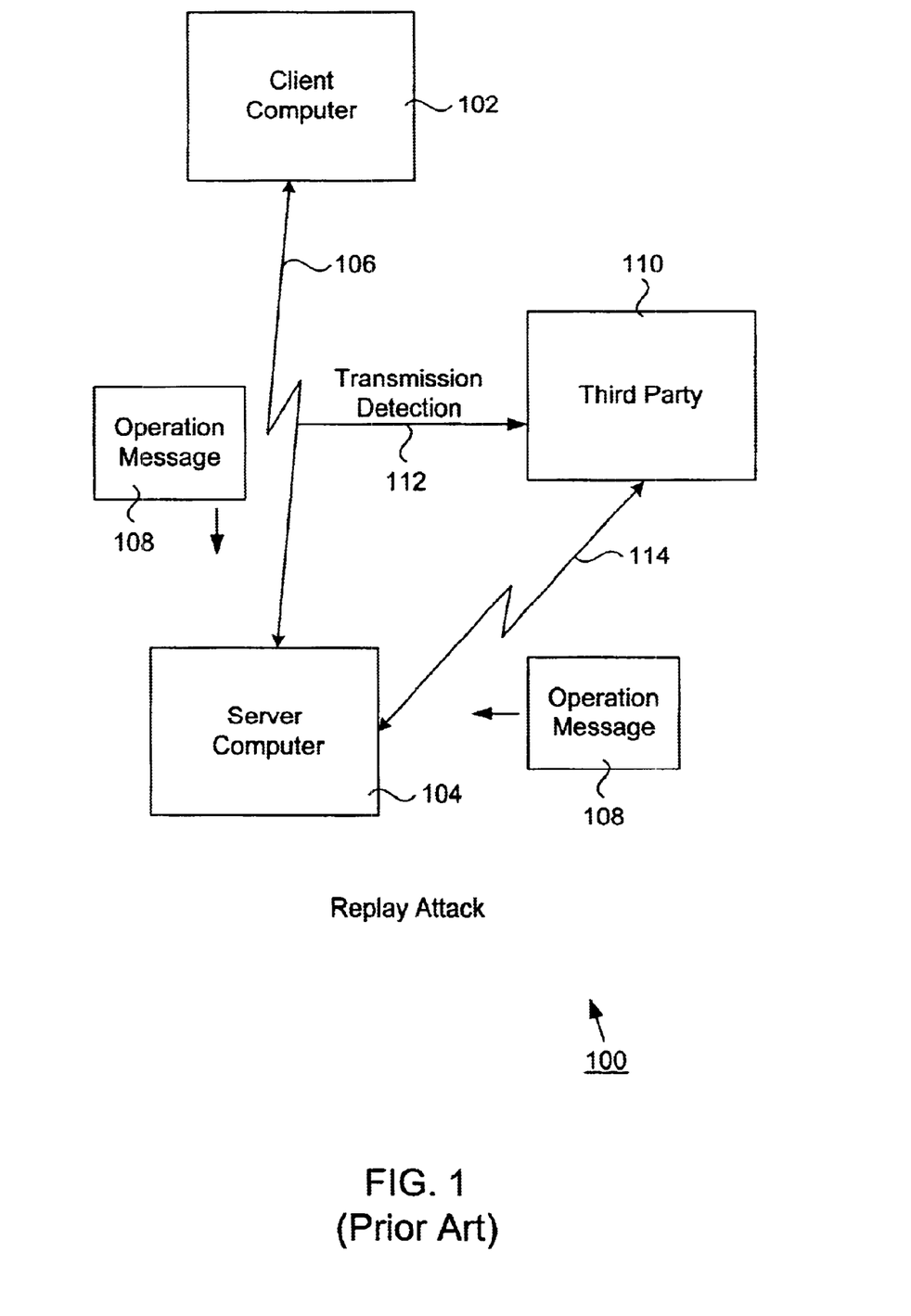
FIG. 1 illustrates a prior art arrangement that is subject to a replay attack.

FIG. 1 illustrates a prior art arrangement 100 that illustrates a replay attack. Shown is a client computer 102 communicating with a server computer 104 over any suitable known communication medium 106. In the course of this communication, client 102 sends operation message 108 to server computer 104. Message 108 may or may not be encrypted and may or may not be part of a secure session. In this illustration, an unscrupulous third party 110 uses any suitable means to detect the transmission of operation message 108 from client 102 to server 104. Because third party 110 detects message 108 in its entirety and is not seeking to understand message 108, it is irrelevant to third party 110 whether the message is encrypted or not.

As part of the replay attack, third party 210 takes message 108 captured earlier and resends it at a later time to server computer 104 which may be unaware that message 108 is coming from a third party. If the replay attack is implemented successfully the server will believe that message 108 is coming from client 102 when actually it is being transmitted by third party 110. Because server 104 is unaware of the origin of the message, it may perform the operation present in the message unaware that the message did not come from client 102. Depending upon the content of operation message 108, the results of server 104 performing this operation again may have disastrous results. For example, message 108 might be a command to delete particular data, modify data, increment a user's balance by particular amount, disgorge funds electronically, release sensitive information, etc.

Even if client 102 and server 104 had used sophisticated encryption to encrypt message 108 the server will be unaware that the message from the third party is bogus because the third party has replayed message 108 in it entirety and in its encrypted form. The illicit benefit received by third party 110 would not be the understanding of message 108, but the consequences of the operation performed by server 104 when it receives message 108 once again.

Accordingly, what is desired is a system and technique by which a replay attack during communication between computing devices may be prevented.

SUMMARY OF THE INVENTION

A replay attack prevention technique is disclosed that uses a secret algorithm exchanged between client and servers computers. The algorithm is used to periodically alter a special replay key. The replay key may then be used to alter the message sent or alter the digest appended to the message such that the message and or its digest varies as time progresses. An unscrupulous third party who replays a stolen operation message would be unaware of the replay key and its variation. Any stolen message that is replayed by the third party would not include the time varying aspect as expected by the server computer. The server computer would thus be able to detect the attempted fraud.

Preferably, the client and server exchange the secret algorithm before communication begins. The secret replay key may be exchanged at the beginning of the communication session in an encrypted form, or may be exchanged earlier. Because the replay key preferably never appears along with the message, and because the digest cannot be used to discover the replay key, the replay key is kept secret from third parties.

In a system embodiment of the invention, a client computing device and a server computing device communicate over a transmission medium. The client includes a message to be sent to the server over the transmission medium, a cryptographic key, and an alteration algorithm. The alteration algorithm is used to periodically change the cryptographic key, whereby a value to be appended to the message is periodically changed. The server receives the message and the appended value from the client. The server includes the same cryptographic key as in the client, and the same alteration algorithm. Thus, the server may calculate its own version of the value to compare with the received value from the client. A replay attack is prevented because a third party has neither the key or algorithm.

In a variation on this embodiment, the value is a digest calculated from the message using the cryptographic key. In this variation, the server has its own version of the digest calculated from the received message using the cryptographic key. In another embodiment, any number of alteration algorithms are held by the client and server along with an algorithm identifier that identifies which algorithm to be used for a particular transmission.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 2:
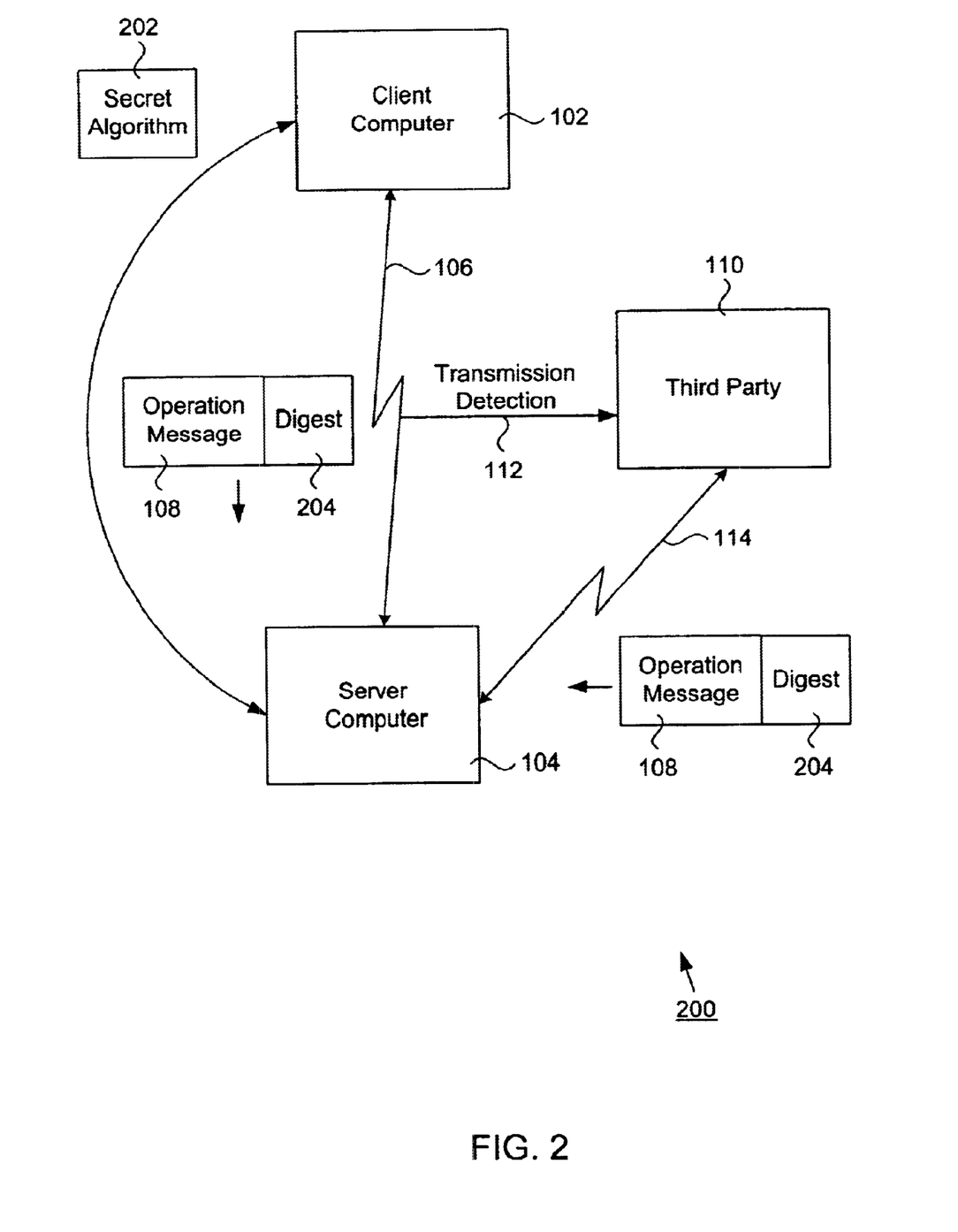
FIG. 2 illustrates an arrangement for preventing a replay attack according to one embodiment of the invention.

FIG. 2 illustrates an arrangement 200 for preventing a replay attack according to one embodiment of the invention. As in FIG. 1, a client computer 102 communicates with server computer 104 over communication medium 106. As before, third party 110 is attempting to illicitly detect operation message 108 and replay it to server computer 104. By previously exchanging a secret replay key alternation algorithm 202, client computer 102 and server computer 104 are able to produce a digest 204 which changes periodically. Once server 104 has received and verified message 108 and digest 204 from client 102 it alters its expectation of a received digest value. Even though third party 110 has captured operation message 108 and its appended digest 204, server computer 104 is expecting a different digest than that received via third party 110, and thus realizes that the subsequent replay of a transmission from third party 110 is bogus. In this fashion a replay attack is prevented.

It should be noted that client 102 and server 104 may each be any suitable computing device and not necessarily a client computer and a server computer. For example, either may be a personal computer, PDA, telephone, or any device capable of carrying out the steps below. In addition, client 102 and server 104 may be two smart cards communicating, or a smart card communicating with a card terminal or other computer.

Figure 3A:
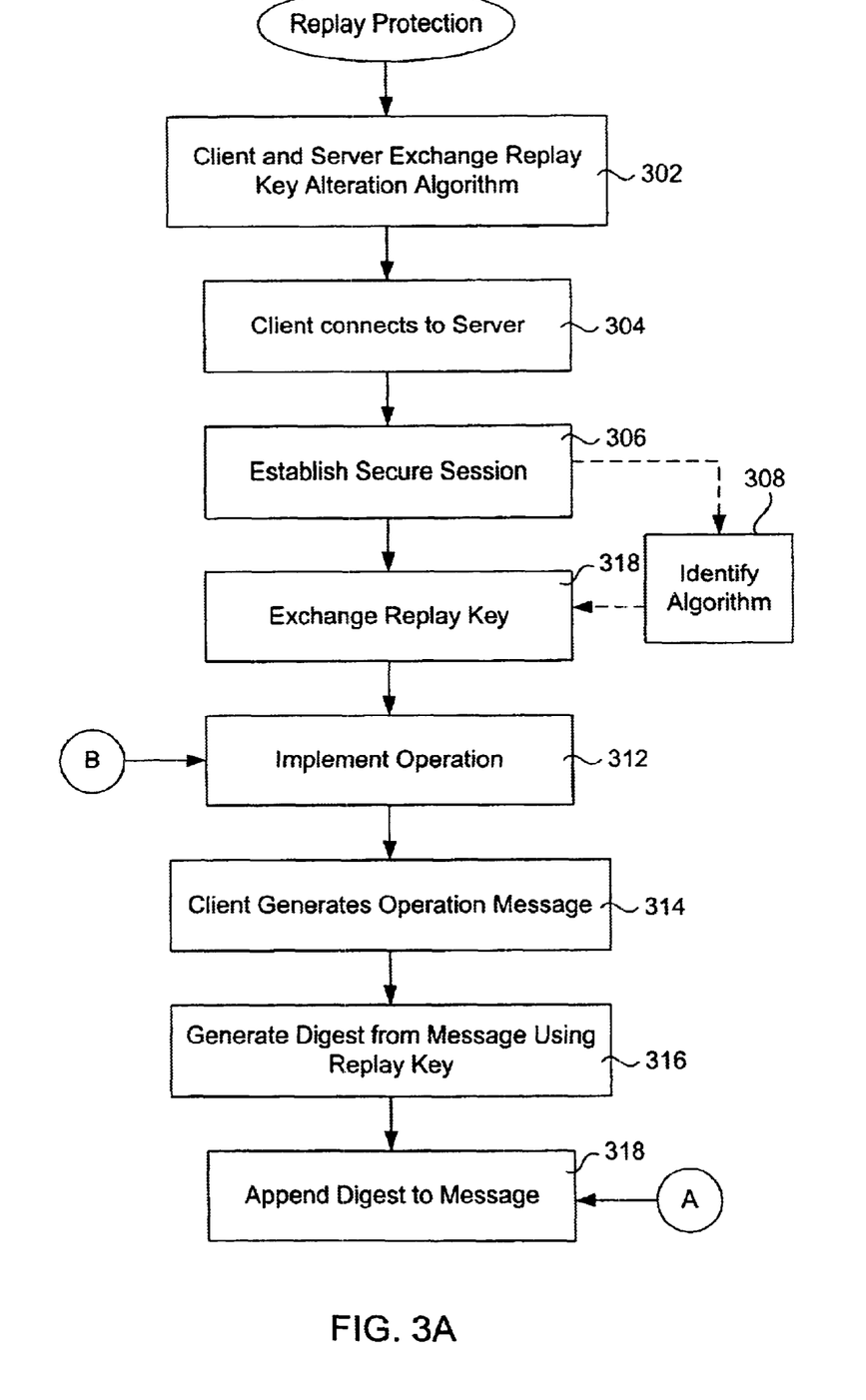
FIGS. 3A and 3B are a flowchart describing how to implement replay protection according to one embodiment of the invention.
Figure 3B:
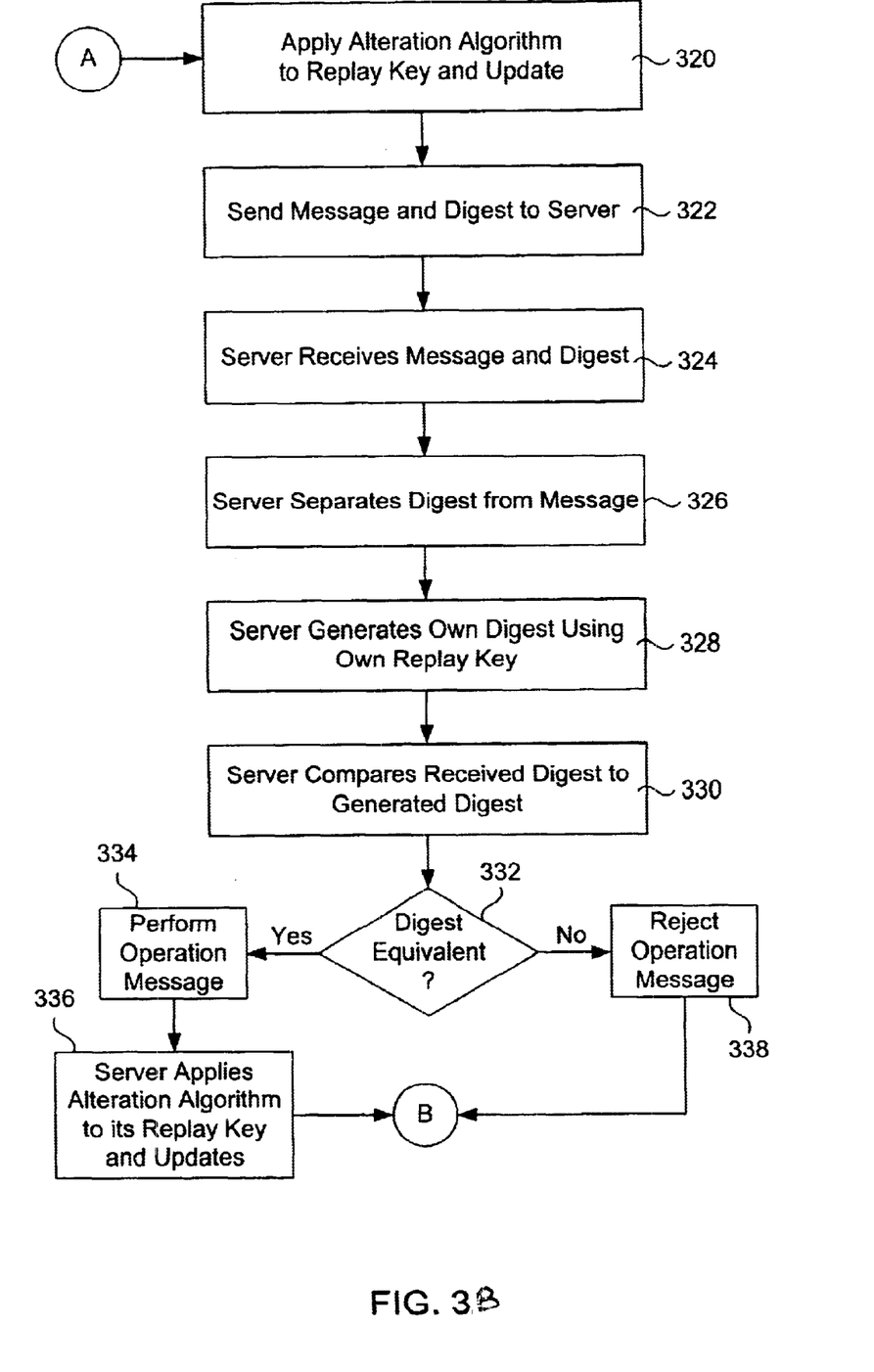

FIGS. 3A and 3B are a flowchart describing how to implement replay protection according to one embodiment of the invention. In step 302 client computer 102 and server computer 104 exchange a secret replay key alteration algorithm known only to the two of them. This algorithm may be exchanged in any manner such as by voice, paper, telephone, electronic mail, facsimile, etc. Preferably, the secret algorithm is exchanged outside of the protected communication session to take place in order to preserve the secrecy of the algorithm. It is possible that more then one algorithm be exchanged so that the client and server may chose to use a particular algorithm when modifying a replay key. The algorithm chosen may be any suitable mathematical algorithm for modifying a replay key. Preferably, the algorithm modifies the key each time it is applied. By way of example, the algorithm may increment the key or decrement it by a particular amount.

In step 304 the client connects to the server over any suitable medium using any suitable protocol. By way of example, the two may communicate over the Internet using TCP/IP protocol, may use X25 protocol, may use PPP, or any other suitable communication protocol. The medium of communication may be any network, LAN, WAN, telephone line, or simple electronic connection between two computing devices.

In step 306 the client and server establish a secure session between the two of them for communication of commands and information. A secure session may be established in many different ways. By way of example, a secure session may be established using public key encryption, for example, SSL. Alternatively, symmetric cryptography may be used. Establishment of a secure session means that any information exchanged between the parties is encrypted and protected from outside parties.

In step 310 the client and server exchange a secret replay key within the secure session. Thus, an unscrupulous third party is not able to detect the replay key. Such a key may be any suitable number, for example a 128-byte value. Each party stores this replay key in a secure location. As an optional step 308, if the parties had previously exchanged multiple replay key alteration algorithms in step 302, they may also identify which of the algorithms to use during the session. Step 310 may also occur before this communication session is begun using any suitable medium and technique of exchange.

Next, the client begins preparation for sending an operation message to the server in order to implement a particular function such as data modification, data deletion, data querying, request for funds transfer, request for balance increment, request for release of information, etc. In step 314 the client generates the particular operation message it desires to send to the server. In step 316 the client uses the secret replay key to generate a digest from the operation message. Generating a digest using a key from a message is a known technique and will be appreciated by those of skill in the art. The digest is a unique sequence of information resulting from a combination of the message and the replay key. Should the replay key be altered, a different digest would be generated from the combination of the message and the altered replay key. In step 318 the client appends the newly generated digest to the operation message.

At this point in step 320 (although it may occur earlier or later), the client applies the secret replay key alternation algorithm to the replay key to update its value. For example, the alteration algorithm may simply increment the replay key by a certain amount. This alteration of the replay key prevents a third party from succeeding with a replay attack. The reason is that the server also alters its replay key in the same way that the client has done. At a given point in time, the version of the replay key used by the client to create a digest is the same version that the server will used to generate a digest for comparison. Because the replay key and the alteration algorithm are not known to the third party, the third party will not be able to generate the digest that is expected by the server because the replay key changes with every transmission from client to server. In other words, even though the third party may detect the exact sequence of bytes that represent operation message 108 and digest 204, the server computer may very well be expecting a different digest by the time the replayed transmission is received from the third party.

It should be pointed out that generation of a unique message and appended information may be implemented in another fashion instead of using a digest. Generation of a digest is preferable, however, as it is a faster technique. In the alternative technique, the secret alteration algorithm may be used to alter the replay key in a manner known only to the client and server. The altered replay key is then simply appended to the message. Both are then encrypted under the secure session and transmitted to the server. As above, even though the third party may detect the exact sequence of bytes representing the message and the replay key, it is unaware of the secret algorithm and is unable to alter the replay key over time as the server may be expecting.

In step 322 operation message 108 and its appended digest 204 are sent to the server. As part of the secure session, these elements may also be encrypted as well. In step 324 the server receives the message and its appended digest. If both have been encrypted under the secure session, the server then decrypts both using the protocol of the secure session. Next, in step 326 the server separates the digest from the message. In step 328 the server then generates its own digest using a combination of the received message and it own replay key. At this point in time, because the replay key used by the client is the same as the replay key held by the server, the digest generated by the server should be equivalent to the digest received from the client.

In step 330, the server compares the received digest to the digest it has generated on it own. If the digests are equivalent in step 332 then in step 334 the server performs operation message 108 received from the client. In step 336 the server then applies the alternation algorithm to its own replay key in order to update the key as the client had done in step 320. Thus, the client and server are synchronized in their alteration of the replay key. Step 336 is performed in a similar manner as had been performed by the client computer in step 320. At this point in time, the replay key of the server is equivalent to that of the client. Next, control returns to step 312 where preparation for another operation message to be exchanged between the client and the server is begun.

It should be apparent at this point that if an unscrupulous third party had detected the operation message and its appended digest and replayed it to the server such an attack would be unsuccessful. Because the server has altered its replay key in step 336 it will generate a different digest from that received from the unscrupulous third party. Should the digest not be equivalent, in step 338 the server simply rejects the operation message and prepares for another incoming message from the client computer.

Thus, it will be apparent that the replay key changes in a predictable manner according to the alternation algorithm and in a fashion previously agreed upon by the client and the server. In one embodiment of the invention, the replay key changes after ever operation message sent to the client from the server. The alternation algorithm may also be applied to the replay key at any other times and with different frequencies as long as the replay key used to generate a digest by the client for a particular message is the same replay key used by the server to generate its own digest for the same message. Because the third party is not aware of the changing replay key, it will attempt to send a detected operation message along with a digest that is out of date. Even though a server computer may receive a valid string of information encrypted appropriately under the secure session, it will generate a different digest then that received from the third party because the server computer has altered its replay key in the expectation of another operation message to be received from a valid client.

COMPUTER SYSTEM EMBODIMENT

Figure 4:
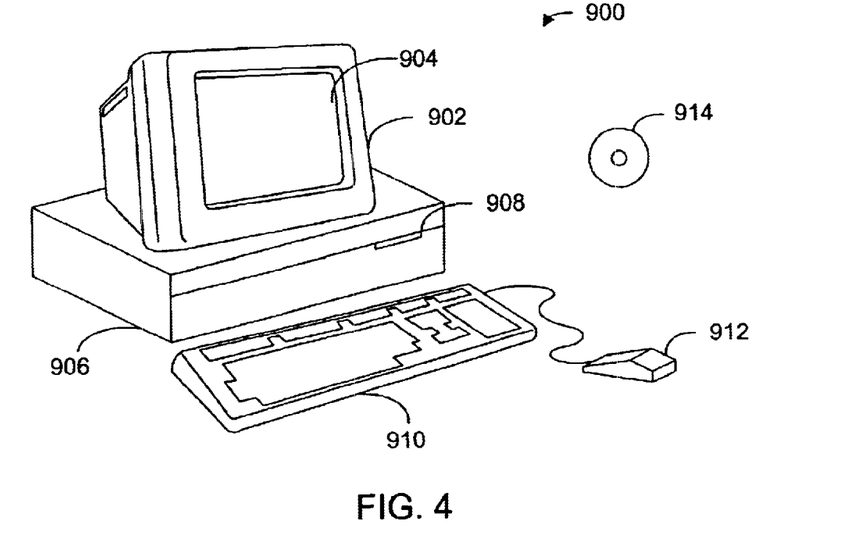
FIGS. 4 and 5 illustrate a computer system suitable for implementing embodiments of the present invention.
Figure 5:
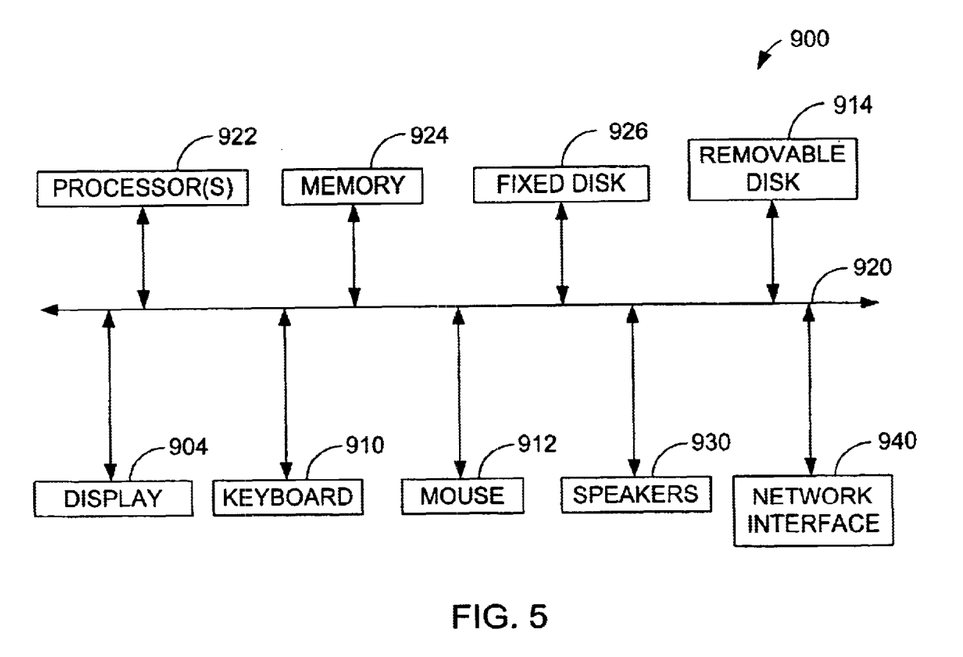

FIGS. 4 and 5 illustrate a computer system 900 suitable for implementing embodiments of the present invention. FIG. 4 shows one possible physical form of the computer system. Of course, the computer system may have many physical forms ranging from an integrated circuit, a smart card, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 5 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. For instance, the two computing devices may be the same or be quite different. The replay key and alteration algorithm may be exchanged well before a communication session, or during that session. The replay key may change after each transmission, or at other frequencies. A digest may be calculated or the key may be appended to the message directly and then encrypted. Therefore, the described embodiments should be taken as illustrative and not restrictive, and the invention should not be limited to the details given herein but should be defined by the following claims and their full scope of equivalents.

I claim:

1. A system for preventing a replay attack comprising:
   a transmission medium for transmitting information;
   a client computing device arranged to connect to said transmission medium, said client computing device including
      a message to be sent over said transmission medium,
      a cryptographic key, and
      a plurality of alteration algorithms for periodically changing said cryptographic key, whereby a value to be appended to said message may be periodically changed;
   a server computing device arranged to connect to said transmission medium and receive said message and said appended value, said server computing device including
      said cryptographic key, and
      said plurality of alteration algorithms, whereby-said server may calculate its own version of said value to compare with said received value to prevent a replay attack.

2. The system of claim 1 wherein said value is a digest calculated from said message using said cryptographic key.

3. The system of claim 2 wherein said server computing device further includes its own version of said digest calculated from said received message using said cryptographic key.

4. The system of claim 1 wherein said client and server computing devices each include:

an algorithm identifier that identifies one of said plurality of alteration algorithms to be used by said client and server computing devices to automatically change said value for a particular transmission.

5. The system of claim 1 wherein said client computing device further includes:

an encryption apparatus for encrypting said message and said appended value before transmission to said server computing device.

6. The system of claim 5 wherein said server computing device further includes:

a decrypting apparatus for decrypting said message and said appended value when received from said client computing device.

7. A method for preventing a replay attack comprising:

exchanging a plurality of key alteration algorithms between a client computing device and a server computing device;

exchanging a cryptographic key between said client and said server;

calculating a value using said key alteration algorithm;

appending said value to a message;

transmitting said message and said appended value from said client to said server;

calculation of its own version of said value by said server using said key alteration algorithm; and comparison of said received value to said calculated value by said server, whereby a replay attack is prevented.

8. The method of claim 7 wherein said value is a digest, said method further comprising:

calculation of said digest from said message using said cryptographic key by said client.

9. The method of claim 7 wherein said value is a digest, said method further comprising:

calculation of a version of said digest from said message using said cryptographic key by said server.

10. The method of claim 7 further comprising:

alteration of said cryptographic key using said key alternation algorithm by said client.

11. The method of claim 7 further comprising:

alteration of said cryptographic key using said key alternation algorithm by said server.

12. The method of claim 7 further comprising:

exchanging an algorithm identifier between said client and said server that identifies one of said alteration algorithms to be used by said client and server to automatically change said value for a particular transmission.

13. The method of claim 7 further comprising:

establishing a secure session between said client and said server; and encrypting said message and said appended value before transmission to said server.

14. The method of claim 7 further comprising:

reception of said message and said appended value from a third party by said server;

comparing said value to a newly calculated value; and rejecting said message received from said third party.

15. A method for preventing a replay attack comprising:

exchanging a plurality of key alteration algorithms between a client computing device and a server computing device;

exchanging a cryptographic key between said client and said server;

receiving a message and an appended value from said client;

calculating of its own version of said value by said server using said key alteration algorithm; and comparing said received value to said calculated value by said server, whereby a replay attack is prevented.

16. The method of claim 15 wherein said value is a digest and is calculated by said client from said message using said cryptographic key.

17. The method of claim 15 wherein said value is a digest, said method further comprising:

calculating a version of said digest from said message using said cryptographic key by said server.

18. The method of claim 15 further comprising:

altering said cryptographic key using said key alternation algorithm by said server.

19. The method of claim 18 further comprising:

receiving said message and an appended value from a third party by said server;

comparing said value to a value newly calculated from said altered cryptographic key; and rejecting said message received from said third party.

20. The method of claim 15 further comprising:

exchanging an algorithm identifier between said client and said server that identifies one of said alteration algorithms to be used by said client and server to automatically change said value for a particular transmission.

21. The method of claim 15 further comprising:

receiving said message and said appended value from a third party by said server;

comparing said value to a newly calculated value; and rejecting said message received from said third party.

* * * * *

UNITED STATES PATENT AND TRADEMARK OFFICE
CERTIFICATE OF CORRECTION

PATENT NO. : 6,633,980 B1
DATED : October 14, 2003
INVENTOR(S) : Thomas V. Johnson It is certified that error appears in the above-identified patent and that said Letters Patent is hereby corrected as shown below:

<u>Column 1,</u>
Line 20, "third party 210" should read -- third party 110 --.

Signed and Sealed this

Twentieth Day of July, 2004

JON W. DUDAS
*Acting Director of the United States Patent and Trademark Office*